US008160594B2

(12) United States Patent
Sato et al.

(10) Patent No.: US 8,160,594 B2
(45) Date of Patent: Apr. 17, 2012

(54) RADIO PROPAGATION ESTIMATING METHOD AND RADIO PROPAGATION ESTIMATING APPARATUS

(75) Inventors: Yoshihito Sato, Hitachi (JP); Yoshinori Okura, Mito (JP)

(73) Assignee: Hitachi, Ltd., Tokyo (JP)

( * ) Notice: Subject to any disclaimer, the term of this patent is extended or adjusted under 35 U.S.C. 154(b) by 829 days.

(21) Appl. No.: 11/646,450

(22) Filed: Dec. 28, 2006

(65) Prior Publication Data

US 2008/0161005 A1 Jul. 3, 2008

(51) Int. Cl.
*H04W 40/00* (2009.01)
(52) U.S. Cl. ............... 455/446; 455/422.1; 455/429; 709/226
(58) Field of Classification Search .................. None
See application file for complete search history.

(56) References Cited

U.S. PATENT DOCUMENTS

| 5,491,644 A * | 2/1996 | Pickering et al. ............ 709/226 |
| 5,828,960 A * | 10/1998 | Tang et al. .................... 455/446 |
| 6,341,223 B1 * | 1/2002 | Park .............................. 455/446 |
| 7,324,588 B2 * | 1/2008 | Green et al. ................. 375/224 |
| 2009/0122706 A1 * | 5/2009 | Alfano et al. ................ 370/237 |

FOREIGN PATENT DOCUMENTS

| JP | 10-62468 A | 3/1998 |
| JP | 2001-28570 A | 1/2001 |

* cited by examiner

*Primary Examiner* — Rafael Pérez-Gutiérrez
*Assistant Examiner* — Daniel Nobile
(74) *Attorney, Agent, or Firm* — Crowell & Moring LLP

(57) ABSTRACT

A radio propagation path from a transmitting point to a receiving point is estimated accurately with a relatively small amount of calculation. A predetermined-size receiving area including the receiving point is set, radio propagation paths from the transmitting point to the receiving area is estimated by a ray launching method, object surfaces existing in the paths are extracted, and a radio propagation path from the transmitting point to the receiving point is estimated by an imaging method using only the extracted object surfaces.

7 Claims, 15 Drawing Sheets

RADIO PROPAGATION ESTIMATING METHOD AND RADIO PROPAGATION ESTIMATING APPARATUS

BACKGROUND OF THE INVENTION

The present invention relates to a radio propagation estimating program, a radio propagation estimating method, and an apparatus executing this method that are used in the layout design of a base station in a wireless LAN system, a mobile phone/PHS system, and a broadcasting system for analyzing a radio propagation path in a predetermined space, and more particularly to a radio propagation estimating program, a radio propagation estimating method, and an apparatus executing this method for analyzing the power of a radio wave that arrives at a receiving point.

Recently, a wireless network system such as a mobile phone, a PHS, a wireless LAN, and a DSRC (Dedicated Short Range Communication) finds many applications as more and more infrastructure facilities are built and the costs of apparatuses are lowered. In such a wireless network system, the radio propagation characteristics greatly affect the data communication performance due to factors such as the layout, structure, material, and reflection of the buildings and, therefore, it is necessary to estimate in advance how the radio wave propagates in the space and how far the radio wave can travel.

In general, a radio wave originated from a transmitting antenna in a point in a space travels directly in all directions with the transmitting point as the center. If there is an obstruction in the direction into which the radio wave travels, the radio wave reflects on, passes through, or diffracts around the obstruction, scatters in many directions, and is attenuated. The physical phenomenon of those electromagnetic waves is generated all according to the Maxwell's equation. To solve the Maxwell's equation on a computer, the approximation method must be changed according to its problem size.

For example, a simulation of a broadcasting wave coverage range requires a simulation of a range from several kilometers to several hundred kilometers. In addition, because there are weather conditions and many other factors potentially affecting the radio propagation in this case, the conventional method is that a mathematical expression, statistically obtained from the actual measurement, is used to estimate the power required to cover an intended range according to a distance between the transmitting point and the receiving point.

On the other hand, to simulate a radio propagation path in a DSRC or a wireless LAN where the radio wave coverage distance is limited to a relatively short distance, not the probabilistic method described above but a deterministic method is used to find the radio propagation path. One of the deterministic methods is a ray tracing method (light ray tracing method) in which the propagation of electromagnetic waves is calculated as a propagation similar to that of light. The known methods of this ray tracing method are an imaging method (mirror image method) and a ray launching method.

The calculation principle of the imaging method will be described with reference to FIG. 13.

Assume that there are two object surfaces, a ceiling surface 3 and a floor surface 4, on which a radio wave is reflected in the target space. In this case, there are the following paths via which the radio wave propagates from a transmitting point 1 to a receiving point 2 within two reflections: (1) a path via which the radio wave arrives directly from the transmitting point 1 at the receiving point 2 (2) a path via which the radio wave is reflected once on the ceiling surface 3 or on the floor surface 4 before arriving at the receiving point 2 (3) a path via which the radio wave is reflected on the ceiling surface 3 and then on the floor surface 4 before arriving at the receiving point 2, and (4) a path via which the radio wave is reflected on the floor surface 4 and then on the ceiling surface 3 before arriving at the receiving point 2.

The following describes how to calculate a path (4), that is, the path via which the radio wave is reflected on the floor surface 4 and then on the ceiling surface 3 before arriving at the receiving point 2.

First, with the floor surface 4 as a mirror surface, the positions where the receiving point 2 and the ceiling surface 3 are reflected as mirror images are calculated. Let those positions be a mirror image 5 of the receiving point with respect to the floor surface and a mirror image 7 of the ceiling surface with respect to the floor surface, respectively. In addition, with the mirror image 7 of the ceiling surface as a mirror image surface, the position where the mirror image 5 of the receiving point with respect to the floor surface is calculated and this position is set as a mirror image 6 of the receiving point with respect to the floor surface/ceiling surface. After that, a straight line is drawn from the transmitting point 1 to the mirror image 6 of the receiving point with respect to the floor surface/ceiling surface to find the intersection between the straight line and the floor surface 304 and between the straight line and the mirror image 7 of the ceiling surface with respect to the floor surface. The propagation path in the real-image world can be found by returning those intersections back to the real-image world by reversing the procedure for finding the mirror image of the receiving point.

To actually find a propagation path using the imaging method described above, the following procedure is used.

First, the permutations of n object surfaces of the reflection candidates from all object surfaces (m) in the target space are calculated and the result is set as the reflection path candidates. The number of permutations, in other words, the number of reflection candidates, is $_mP_n$. The mirror image calculation described above is performed for the reflection path candidates to find image reflection points and, based on the image reflection points, the reverse mirror image calculation is performed to find the reflection points in the real space. Joining the reflection points with a line produces a propagation path calculated in the imaging method. In the imaging method, the processing described above is repeated the number of times, from one reflection to a predetermined maximum number of reflections N, to find all propagation paths.

Next, the calculation principle of the ray launching method will be described with reference to FIG. 14.

In the ray launching method, rays are generated from a transmitting point 1 in many directions. When generating rays in this method, rays may be generated either evenly in many directions or according to the directional characteristics of the transmitting antenna. The ray launching method searches for an object that exists in the traveling direction of each ray and, if any, finds the intersection with the object, changes the direction of the ray to the mirror surface reflection direction with the intersection as the reflection point, and repeats the search for an object in the ray traveling direction. Rays 11 and 12 shown in FIG. 14 have no object in their traveling directions. On the other hand, ray 13 is reflected on the floor surface 4, changes its direction, is reflected again on a ceiling surface 3 existing in its traveling direction, and changes its direction again. Because there is a receiving point 2 in this case, it is found that the ray 13 is one of the propagation paths. Ray 14 is found to be a direct wave because it arrives at the receiving point 2 that is in its initial generation direction. Because a ray 15 is reflected on the floor surface 4 but there is no object in its traveling direction that has been changed, the ray search is terminated at this point. The ray launch method finds propagation paths as described above.

Although the calculation load of the ray launching method, in which the calculation load increases linearly as the number of object surfaces increases, is lighter than that of the imaging method in which the calculation load increases exponentially as the number of object surfaces increases, the ray launching method has a disadvantage that the radio propagation paths cannot be found accurately. For example, even if rays are generated at the transmitting point and arrive at the receiving point, the paths of some rays cannot be found. To solve this problem, a large receiving area 8 (FIG. 14) including the receiving point is set up to find rays arriving at this receiving area, with the result that the ray paths not actually arriving at the reception point are found. The reduction in accuracy is proportional to the distance between the transmitting point and the receiving point.

On the other hand, the imaging method that, in principle, finds the propagation paths from the transmitting point to the receiving point accurately is an extremely accurate calculation method. However, the calculation time increases exponentially as the number of object surfaces increases as described above, because the calculation time is proportional to a number represented by the permutations of the number of object surfaces of reflection candidates from the number of all object surfaces.

To solve this problem, a technology is disclosed in JP-A-10-62468 shown below for reducing the calculation load while maintaining the calculation accuracy of the imaging method.

This technology narrows down the object surfaces in the target space only to those viewable from both the transmitting point and the receiving point to reduce the calculation time of the imaging method.

It should be noted that, if the distance between the transmitting antenna and the receiving antenna is too large when the ray tracing method is used, ray approximation cannot sometimes be performed due to random events probabilistically caused by weather conditions or moving objects or due to diffraction generated by the roundness of the Earth.

In such a case, an approximation expression is statistically prepared from the measurement value of the power arriving at a receiving point, and the receiving power is calculated by changing the parameters of the approximation expression or the approximation expression itself according to the conditions (mountains, cities, etc.) existing between the transmitting antenna and the receiving antenna. However, it is difficult to accurately calculate the power, which arrives the receiving point, by this method.

JP-A-2001-28570 described below discloses a method for finding an arriving power as accurately as possible in which an experimental formula based on the rule of thumb is applied to the propagation paths obtained by the ray tracing method and, based on the result, the electric field intensity at the receiving point is estimated.

SUMMARY OF THE INVENTION

However, though the technology disclosed in JP-A-10-62468 certainly reduces the calculation load, the paths leading to the receiving point cannot sometimes be found because the calculation is performed only for the object surfaces viewable from both the transmitting point and the receiving point, resulting in a problem that the calculation accuracy is not very high.

Also, the technology disclosed in JP-A-2001-28570, which already adds a multi-path effect to the experimental expression based on the rule of thumb, doubly adds a multi-path effect, resulting in a problem that the calculation accuracy is not very high.

To solve the above problems, it is an object of an invention of this application to provide a radio propagation estimating program, a radio propagation estimating method, and an apparatus executing this method that can reduce the calculation load while calculating radio propagation paths accurately.

It is an object of another invention of this application to provide a radio propagation estimating program, a radio propagation estimating method, and an apparatus executing this method that can estimate the arriving power at a receiving point set up remotely from a transmitting point.

A radio propagation estimating program according to the invention that achieves the above objects is a radio propagation estimating program that estimates a radio propagation path from a transmitting point of a radio wave to a receiving point. The program causes a computer to execute an acceptance step that accepts a position of the transmitting point and a position of the receiving point; an object surface acquisition step that acquires data on object surfaces that may affect the radio wave from the transmitting point; a receiving area setting step that sets a predetermined-size receiving area that includes the receiving point; a ray launching method-based path estimation step that estimates, via a ray launching method, radio propagation paths from the transmitting point to the receiving area using the object surfaces whose data is acquired in the object surface acquisition step; an object surface extraction step that extracts object surfaces, existing in the radio propagation paths estimated by the ray launching method, from the object surfaces acquired by the object surface acquisition step; and an imaging method-based path estimation step that estimates, via an imaging method, a radio propagation path from the transmitting point to the receiving point using only the object surfaces, extracted by the object surface extraction step, as object surfaces on which the radio wave is reflected and which change a direction of the path.

A radio propagation estimating method according to the invention that achieves the above objects executes the steps of the radio propagation estimating program described above. A radio propagation estimating apparatus according to the invention that achieves the above objects is a computer that includes the radio propagation estimating program and that executes the program.

A radio propagation estimating program according to the another invention that achieves the above objects is a radio propagation estimating program that estimates an arriving power at a receiving point existing in a long distance area at least a predetermined distance away from a transmitting point. The program causes a computer to execute a probabilistic power estimation step that estimates, at a boundary of the long distance area on the transmitting point side, the arriving power from the transmitting point using a pre-set empirical expression or experimental expression; a power pseudo conversion step that uses the deterministic power estimation method to estimate the transmission power, which is transmitted at the transmitting point so that the arriving power described above can be obtained at the boundary, assuming that there is no object surface between the boundary of the long-distance area and the transmitting point; a path estimation step that estimates a radio propagation path from the transmitting point to the receiving point in the long distance area assuming that there is no object surface between the boundary of the long distance area and the transmitting point; and an arrival power estimation step that uses a deterministic power estimation method to estimate the arriving power of the radio wave that arrives the receiving point via the radio propagation path estimated by the path estimation step assuming that the radio wave is transmitted from the transmitting point at the transmission power obtained by the power pseudo conversion step.

A radio propagation estimating method according to the invention that achieves the above objects executes the steps of the radio propagation estimating program described above. A radio propagation estimating apparatus according to the invention that achieves the above objects is a computer that includes the radio propagation estimating program and that executes the program.

According to the invention of this application, the ray launching method is used to narrow down the object surfaces in the target space and the imaging method is used to estimate a path using the object surfaces that have been narrowed down, thereby ensuring high calculation accuracy while reducing the path calculation load.

According to the another invention of this application, the probabilistic power estimation method is used to the boundary of a long-distance area that is relatively near to the receiving point to estimate the arriving power at the receiving point in the long-distance area and, from there to the receiving point, the deterministic power estimation method is used. Thus, the arriving power at the receiving point is estimated accurately without considering the multi-path effect doubly.

The other objects, features and advantages of the present invention will become more apparent from the following description of the embodiments of the present invention taken in conjunction with accompanying drawings.

DESCRIPTION OF THE EMBODIMENTS

Embodiments of a radio propagation estimating apparatus according to the present invention will be described below with reference to the drawings.

First Embodiment

First, a radio propagation estimating apparatus in a first embodiment of the present invention will be described with reference to FIGS. 1-9.

Figure 1:
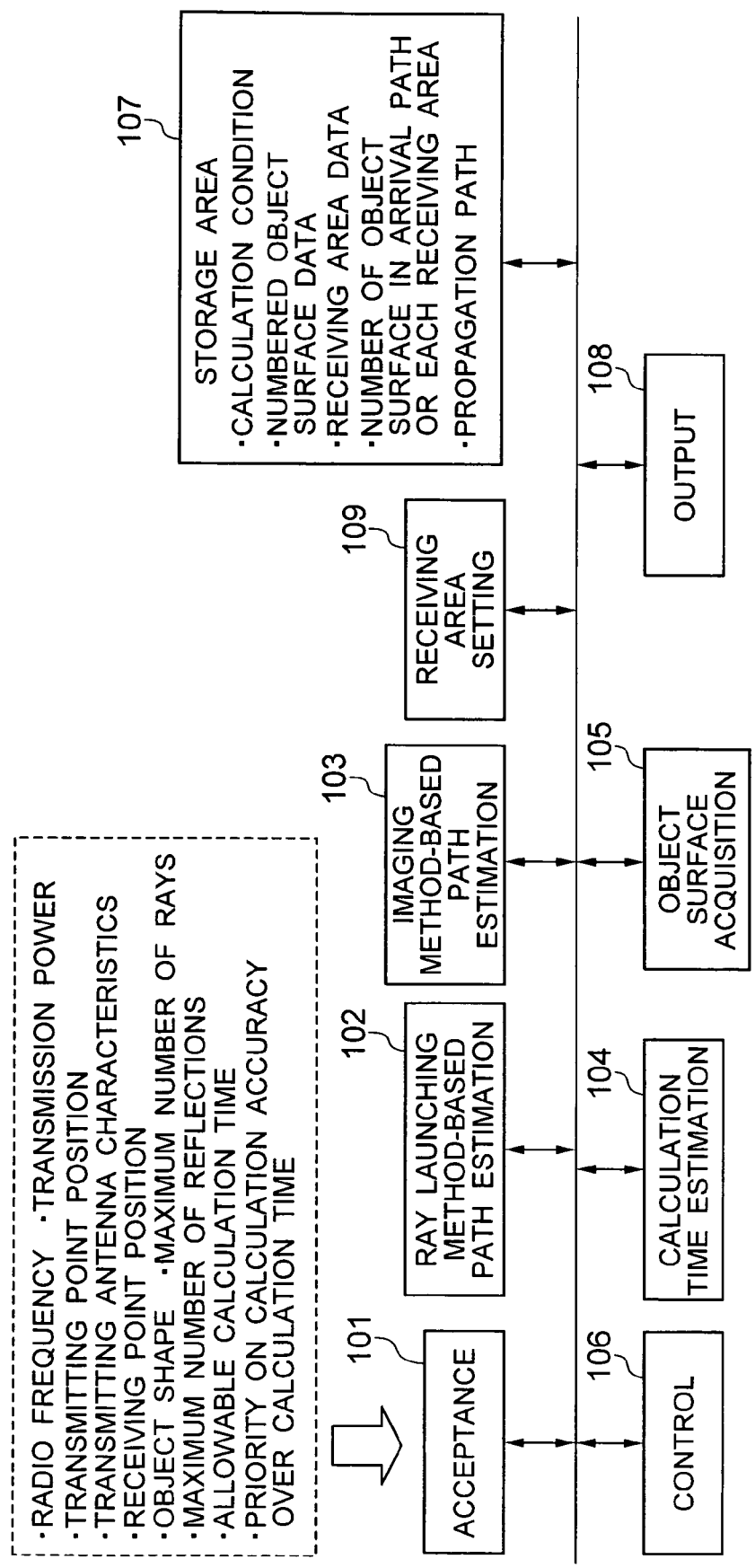
FIG. 1 is a functional block diagram showing a radio propagation estimating apparatus in a first embodiment.

As shown in FIG. 1, the radio propagation estimating apparatus in this embodiment functionally comprises an acceptance unit 101 that accepts calculation conditions necessary for estimating a radio propagation path, a ray launching method-based path estimation unit 102 that estimates a radio propagation path using the ray launching method, an imaging method-based path estimation unit that estimates a radio propagation path using the imaging method, a calculation time estimation unit 104 that estimates a time for calculating a radio propagation path using the imaging method, an object surface acquisition unit 105 that acquires object surface (flat surface) data, which represents the surface of an object, from the shape and the position of the object such as a structure or a natural object accepted by the acceptance unit 101, a receiving area setting unit 109 that sets a receiving area, which includes a receiving point, from receiving point data accepted by the acceptance unit 101, a storage area 107 that stores calculation conditions accepted by the acceptance unit 101, an output unit 108 that outputs a propagation path and so on estimated by the path estimation units 102 and 103, and a control unit 106 that controls those components.

The hardware of this radio propagation estimating apparatus, which is a computer, comprises a computer main body, input devices such as a keyboard, a mouse, and so on, and output devices such as a printer, a display, and so on. The above-described path estimation units 102 and 103, the calculation time estimation unit 104, the object surface acquisition unit 105, the receiving area setting unit 109, and the control unit 106 each comprise the memory of the computer main body and a CPU that executes the programs stored in this memory. The acceptance unit 101 comprises the input device, the memory of the computer main body, and the CPU that executes the programs stored in this memory. The storage area 107 comprises the memory of the computer main body and an external storage device. The output unit comprises the output device, the memory of the computer main body, and the CPU that executes the programs stored in this memory.

Next, the following describes the operation of the radio propagation estimating apparatus with reference to the flowchart shown in FIG. 2 to FIG. 6.

The user uses the input device of the apparatus to enter calculation conditions into the apparatus. As shown in the general flowchart in FIG. 2, the apparatus accepts the calculation conditions (S1). More specifically, the calculation conditions, which are calculation conditions accepted by the acceptance unit 101 of the apparatus and stored in the storage area 107, include a radio frequency, a transmission power, transmitting point position data, transmitting antenna characteristics, receiving point position data, shape and position data on an object such as a structure or a natural object, the maximum number of rays generated from the transmitting point when a path is estimated using the ray launching method, the maximum number of allowable reflections until the radio wave arrives at the receiving point, an allowable time for calculating a radio propagation path using the imaging method, and a priority of the calculation time over the calculation accuracy when a radio propagation path is calculated using the imaging method.

Figure 7:
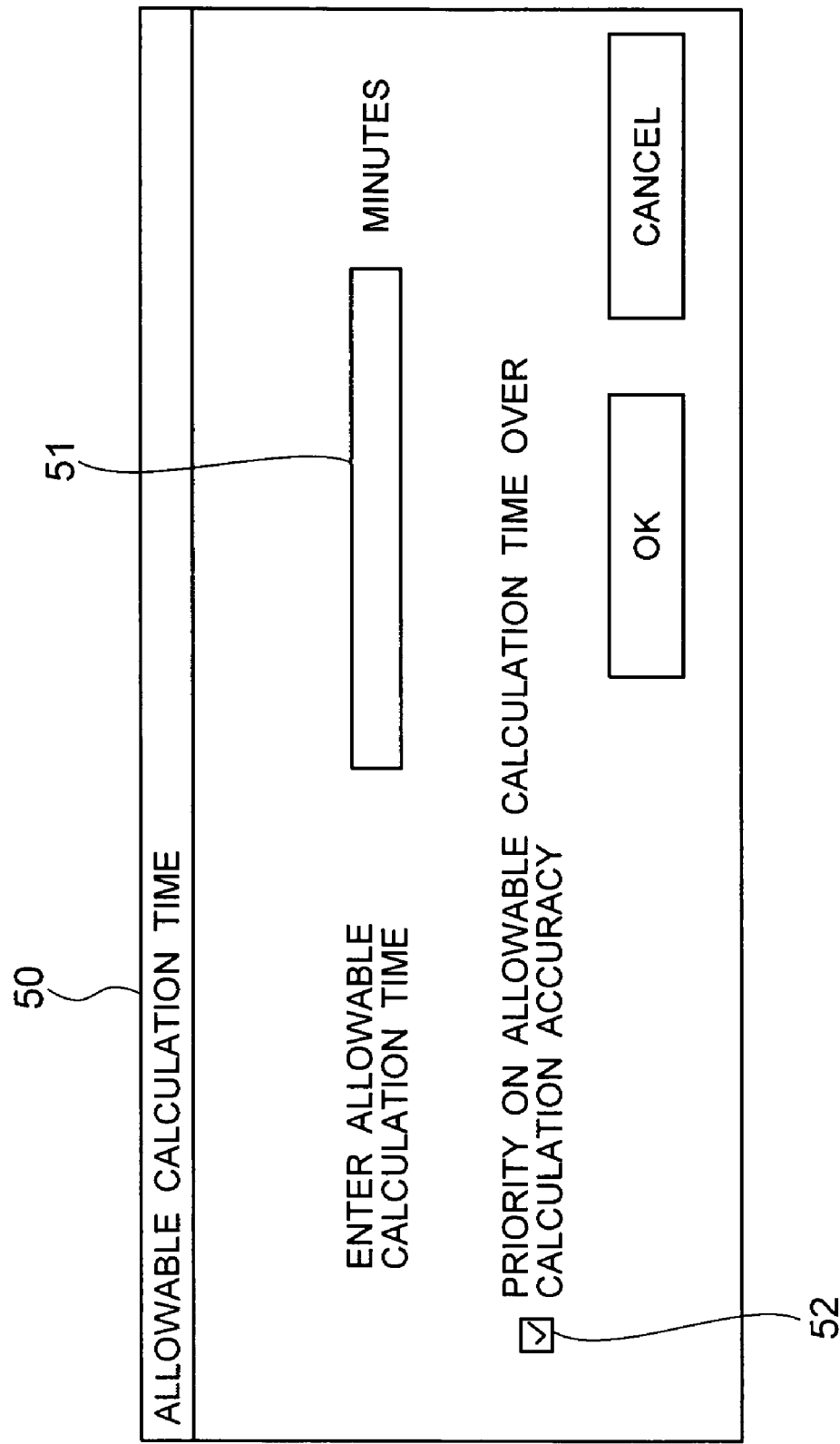
FIG. 7 is a diagram showing an allowable time entry screen in the first embodiment.

Out of those calculation conditions, an allowable calculation time and the priority of calculation accuracy are entered in a calculation condition entry screen 50, such as the one shown in FIG. 7, displayed on the display that is one of the output devices. The user enters an allowable calculation time in an allowable calculation time entry field 51 on the calculation condition entry screen 50 and, if the user wants to put priority on the allowable calculation time over calculation accuracy, marks a calculation time priority checkbox 52.

After the acceptance unit 101 of the radio propagation estimating apparatus accepts the calculation conditions (S1), the object surface acquisition unit 105 uses the object shape and position data on a structure or a natural object to divide the object surface into multiples until the surfaces become substantially flat and, with those multiple surfaces as the object surfaces, registers the position data on those object surfaces, as well as their ID numbers, into the storage area 107 (S2). Although the object surface acquisition unit 105 uses the object shape and position data to automatically find object surface data in the example above, the object surface data may also be entered directly from the input device.

Next, the calculation time estimation unit 104 estimates the calculation time of the imaging method (S3). In estimating this calculation time, a test is performed in advance to find the time required for the execution of "imaging method-based path estimation 2" shown in FIG. 3, which will be described later, with the number of object surfaces and the number of reflections as the parameters, the correspondence among the number of object surfaces, the number of reflections, and the calculation time is summarized as a table, and the calculation time is estimated using this table. It is also possible to assign the learning function to the calculation time estimation unit 104, to store the calculation time each time the "imaging method-based path estimation 2" shown in FIG. 3 is executed, and to modify the above-described table each time the path estimation 2 is executed a predetermined number of times.

After the estimation of the imaging method calculation time is finished (S3), the control unit 106 checks if this estimated calculation time is within the allowable calculation time accepted by the acceptance unit 101 (S4). If the estimated calculation time is within the allowable calculation time, the control unit 106 causes the imaging method-based path estimation unit 103 to execute "imaging method-based path estimation 2" shown in FIG. 3 that will be described later (S5) and terminates the processing. On the other hand, if the estimated calculation time exceeds the allowable time, the control unit 106 checks if the acceptance unit 101 has accepted "priority on calculation time" (S6) and, if "priority on calculation time" has been accepted, causes the ray launching method-based path estimation unit 102 to execute "ray launching method-based path estimation 2" shown in FIG. 4 that will be described later (S7) and terminates the processing.

The following describes "imaging method-based path estimation 2" in step 5 and "ray launching method-based path estimation 2" in step 7 in detail.

Figure 3:
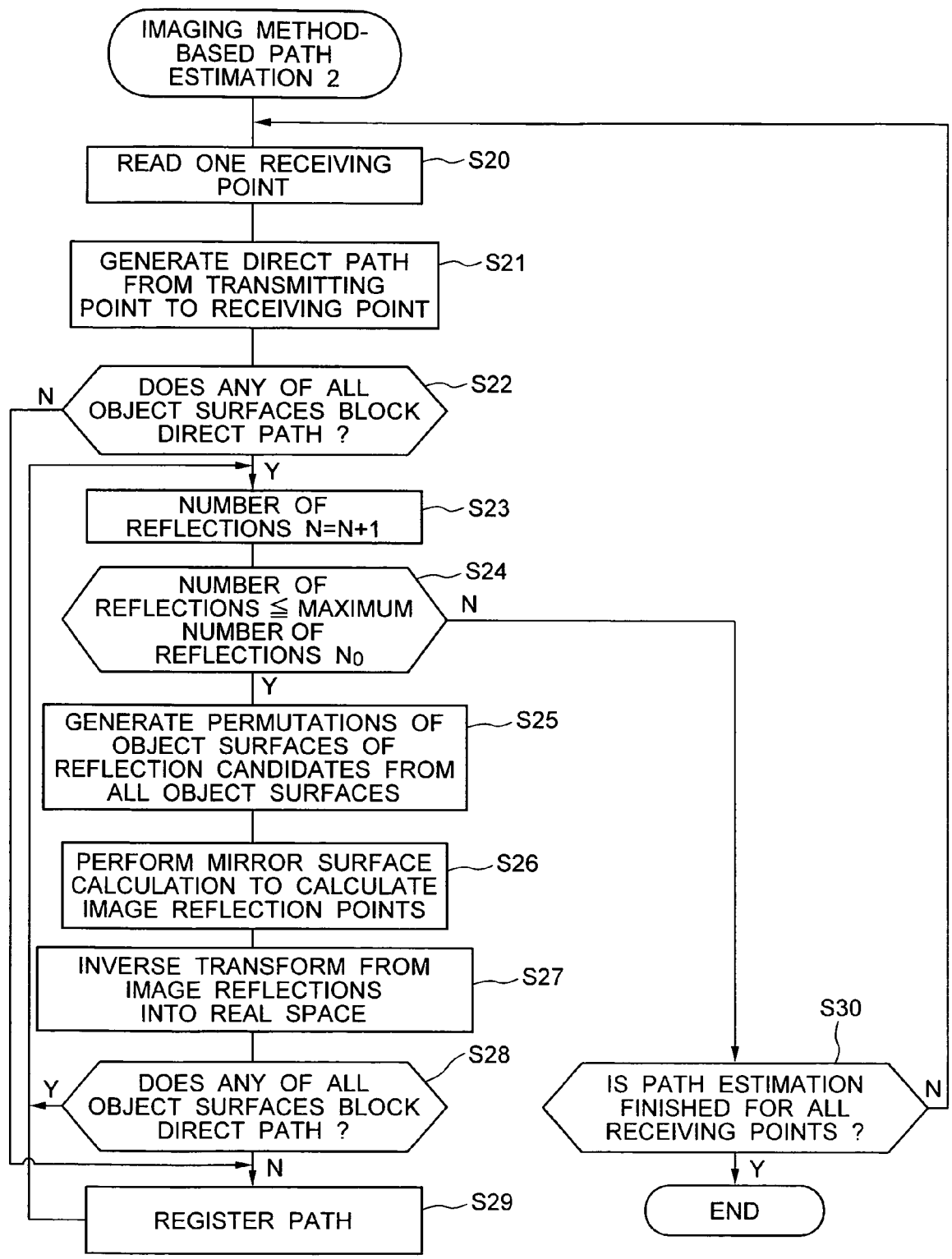
FIG. 3 is a flowchart showing the procedure of the imaging method-based path estimation 2 in step 5 in FIG. 2.

In the imaging method-based path estimation 2 in step 5, the imaging method-based path estimation unit 103 first reads one piece of receiving point data, accepted by the acceptance unit 101, from the storage area 107 as shown in the flowchart in FIG. 3 (S20). And, the unit generates a direct path from the transmitting point to the receiving point (S21) and checks if any of all object surfaces blocks this direct path (S22). If no object surface blocks this direct path, the unit registers this path data in the storage area 107 with this direct path as one of radio propagation paths (S29). If any of object surfaces blocks this direct path, the unit sets the number of reflections to 1 (S23) and checks if the number of reflections is equal to less than the maximum number of reflections $N_0$ ($N_0>2$) accepted by the acceptance unit 101 (S24). If the number of reflections is 1, the unit judges that the number of reflections is equal to or less than the maximum number of reflections $N_0$ and passes control to step 25 (S25). In this step, the unit calculates the permutations of n object surfaces of reflection candidates from all object surfaces (m) in the space and lets the result be reflection path candidates. The number of permutations, in other words, the number of reflection path candidates is $_mP_n$. For those reflection path candidates, the unit performs the mirror image calculation, described above with reference to FIG. 12, to find image reflection points (S26), performs the reverse mirror image calculation for the image reflection points to find reflection points in the real space, joins the reflection points with lines in the order in which the object surfaces of the reflection path candidates appear (S27), and checks if some of all object surfaces block the lines (S28). If some of the all object surfaces block the lines, control is passed back to step 23; if none of all object surfaces block the lines, the unit registers the path indicated by the lines as a propagation path calculated by the imaging method (S29), and passes control back to step 23.

When control is passed back to step 23, the number of reflections is incremented by 1, step 24-step 29 are performed as described above, and the processing of steps Step 23-Step 29 is repeated until the number of reflections exceeds the maximum number of reflections $N_0$ in step 24.

If it is found in step 24 that the number of reflections is larger than the maximum number of reflections $N_0$, the unit checks if path estimation is performed for all receiving points. If path estimation is not performed for all receiving points, the unit returns control to step 20 and reads new receiving point data; if path estimation is performed for all receiving points, the unit terminates the processing.

As described in Background of the Invention, this imaging method, capable of finding accurate propagation paths in principle from the transmitting point to the receiving point, is a highly accurate calculation method. However, because its calculation time is proportional to a number represented by the permutations of the object surfaces of reflection candidates from the number of all object surfaces, the calculation time increases exponentially as the number of object surfaces increases.

Figure 2:
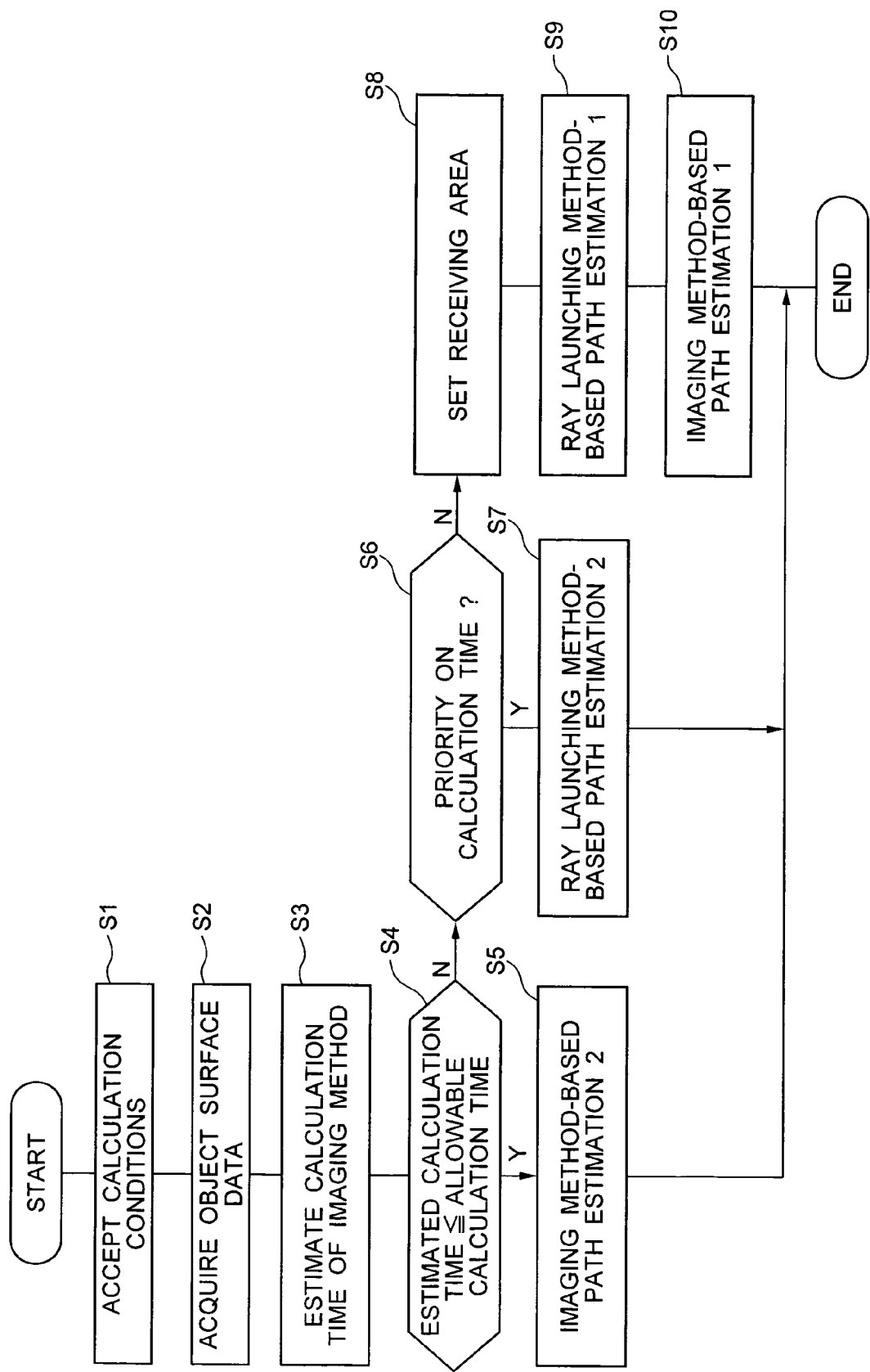
FIG. 2 is a general flowchart showing the operation of the radio propagation estimating apparatus in the first embodiment.

Note that this imaging method-based path estimation 2 is performed if it is found in step 4 in FIG. 2 that the imaging method-based estimated calculation time is within the allowable calculation time. Therefore, the imaging method-based path estimation 2 in step 5 is performed when the number of all object surfaces is small.

Figure 4:
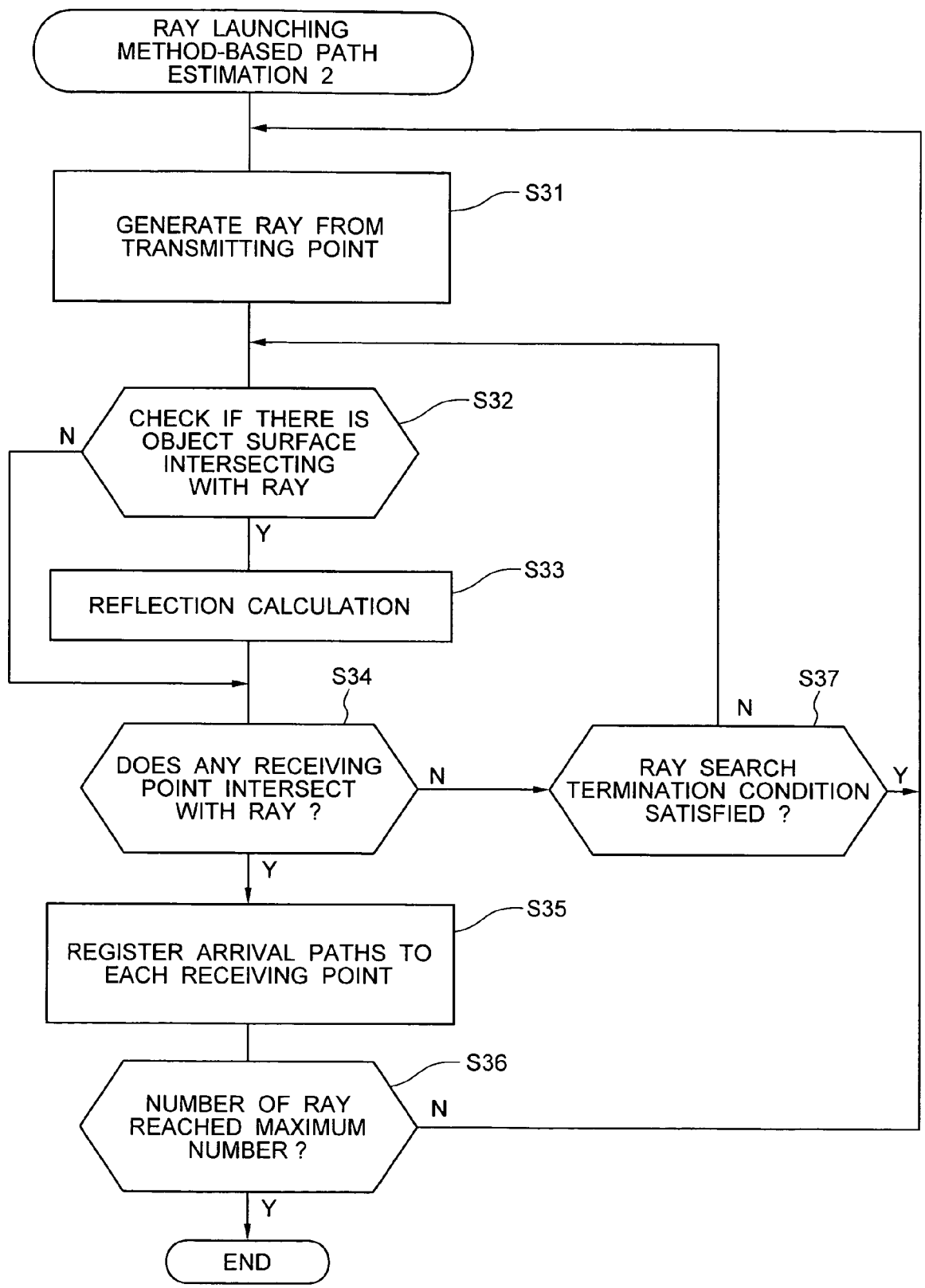
FIG. 4 is a flowchart showing the procedure of the ray launching method-based path estimation 2 in step 7 in FIG. 2.

Next, the following describes "ray launching method-based path estimation 2" in step 7 in FIG. 2 with reference to the flowchart in FIG. 4.

In the ray launching method-based path estimation 2, the ray launching method-based path estimation unit 102 generates one ray from the transmitting point (S31). This ray, originated at the transmitting point, is represented as a half line drawn from the transmitting point into any direction. The ray may be in one of the directions generated by dividing the space angle into equal intervals with the transmitting point as its base or may be one of the rays generated densely in a predetermined angle range considering the directivity characteristics of the transmitting antenna.

Figure 15:
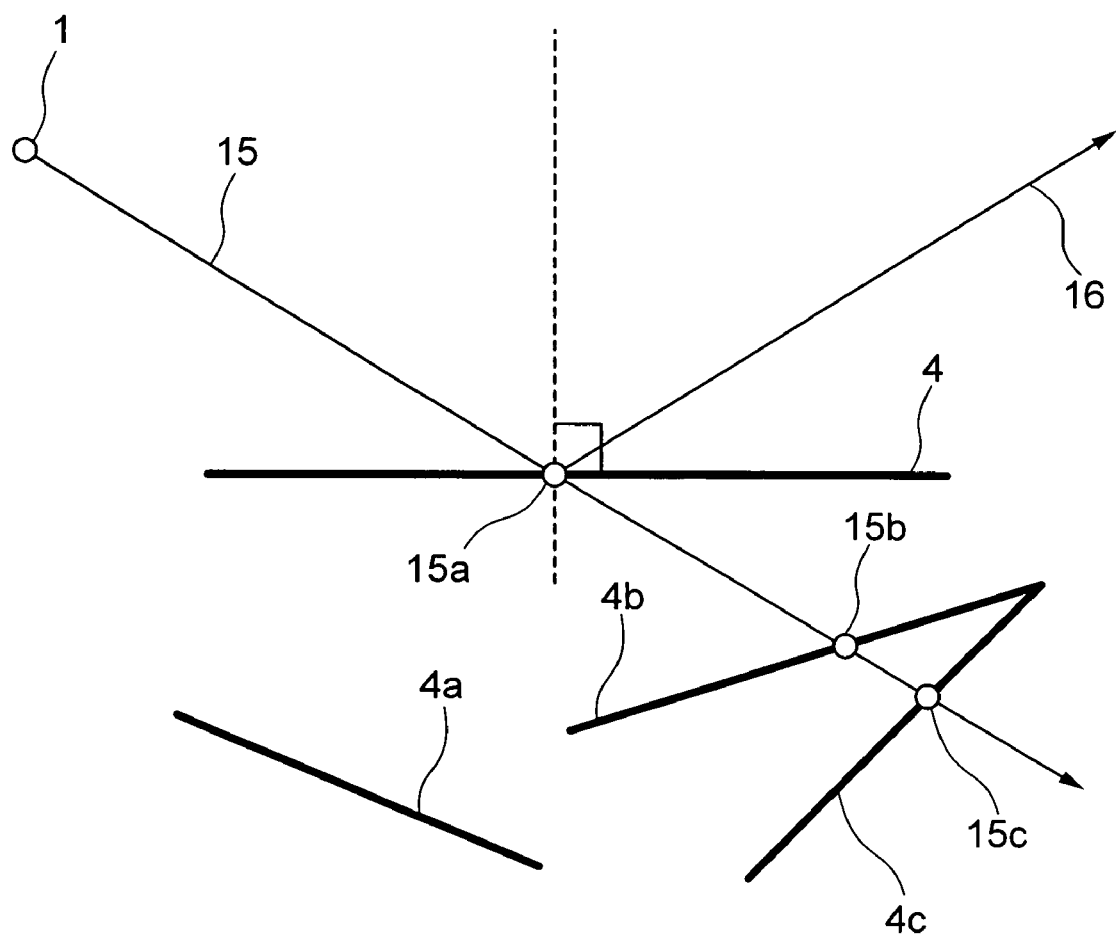
FIG. 15 is a diagram showing how the reflection object surfaces are found by the ray launching method.

The ray launching method-based path estimation unit 102 performs the calculation of intersection of the ray, generated in step 31, with all object surfaces to check if there is an object surface intersecting with this ray (S32). If there is an intersecting object surface, the unit performs reflection calculation for the intersection with this object surface (S33); if there is no intersecting object surface, the unit passes control directly to step 34 (S34). If multiple object surfaces 4, 4b, and 4c intersect with the ray 15 as shown in FIG. 15, the reflection calculation in step 33 is performed for an intersection 15a that is one of intersections 15a, 15b, and 15c and is the intersection with the object surface 4 nearest to the starting point of the ray 15. On the assumption that the ray 15, which enters the object surface 4, changes its direction into the mirror reflection direction at the intersection 15a, the reflection calculation determines the direction of a ray 16 that starts at the intersection 15a. When this calculation is finished, the starting point of the ray becomes the intersection 15a.

In step 34, the unit checks if the ray intersects with any of the receiving points. If there is a receiving point that intersects with the ray, the unit registers the path to the receiving point into the storage area 107 as one of the radio propagation paths (S35). If there is no receiving point that intersects with the ray, the unit checks if the ray search termination condition is satisfied (S37). An example of the search termination condition is that the number of ray reflections exceeds a predetermined allowable maximum number of reflections or that the intensity of the ray falls below the allowable minimum attenuation value. If the ray search termination condition is not satisfied, step 32-step 34 and step 37 are repeated; if the ray search termination condition is satisfied, control returns to step 31 to generate a new ray. When step 32-step 34 and step 37 are repeated, the processing of step 32-step 34 is performed for the ray whose starting point is the intersection calculated by the reflection calculation in step 33.

After the propagation path data is registered in step 35, the unit checks if the number of rays has reached the maximum number of rays accepted by the acceptance unit 101 (S36). If the number of rays has not yet reached the maximum number, control returns to step 31; if the number of rays has reached the maximum number, the processing is terminated.

As described in Background of the Invention, this ray launching method, though quick in calculation, has a drawback that the calculation accuracy is low. However, this ray launching method-based path estimation 2, which is performed when the user puts priority on the calculation time over the calculation accuracy in step 6 in FIG. 2, is processing that meets the user's requirements.

Next, the following describes the general flowchart in FIG. 2 again.

If it is determined in step 6 that "priority on calculation time" is not accepted, the control unit 106 performs the processing of S8, S9, and S10 that are the main processing of this application.

Figure 8:
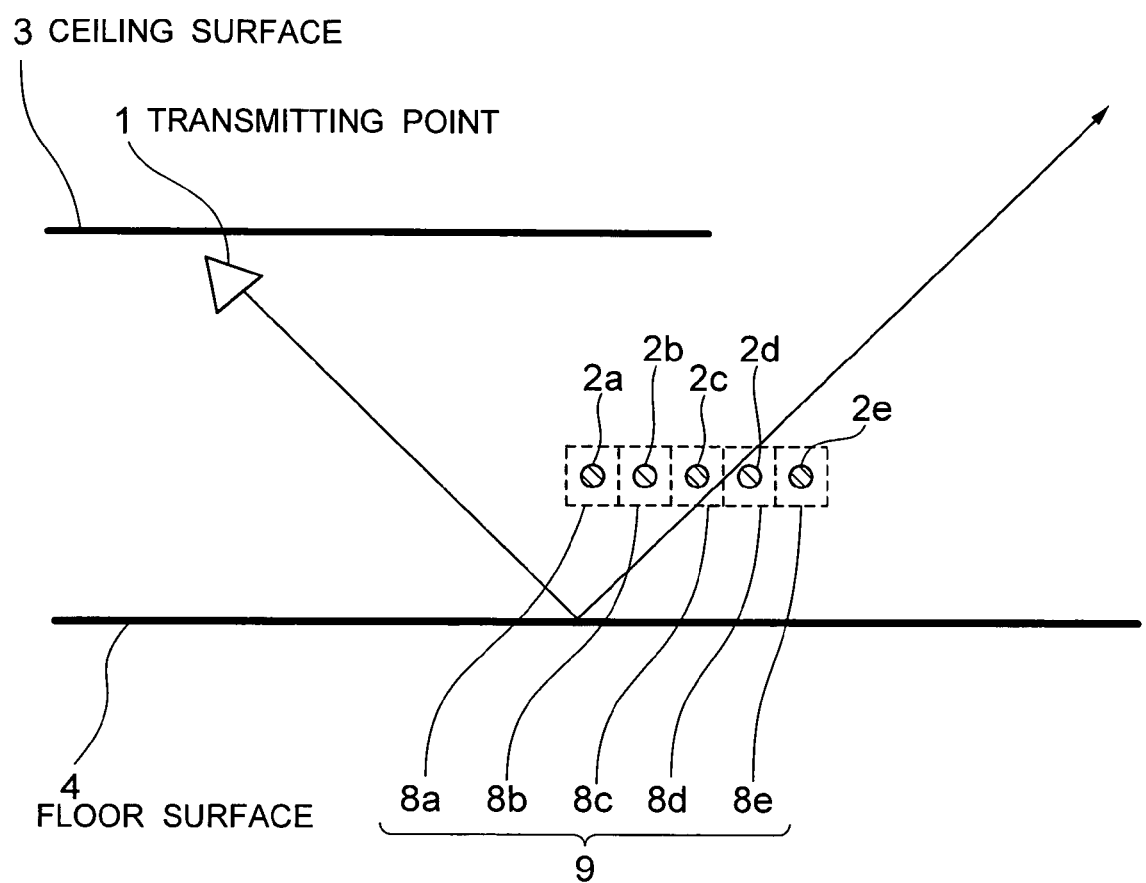
FIG. 8 is a diagram showing the receiving area setting method in the first embodiment.
Figure 9:
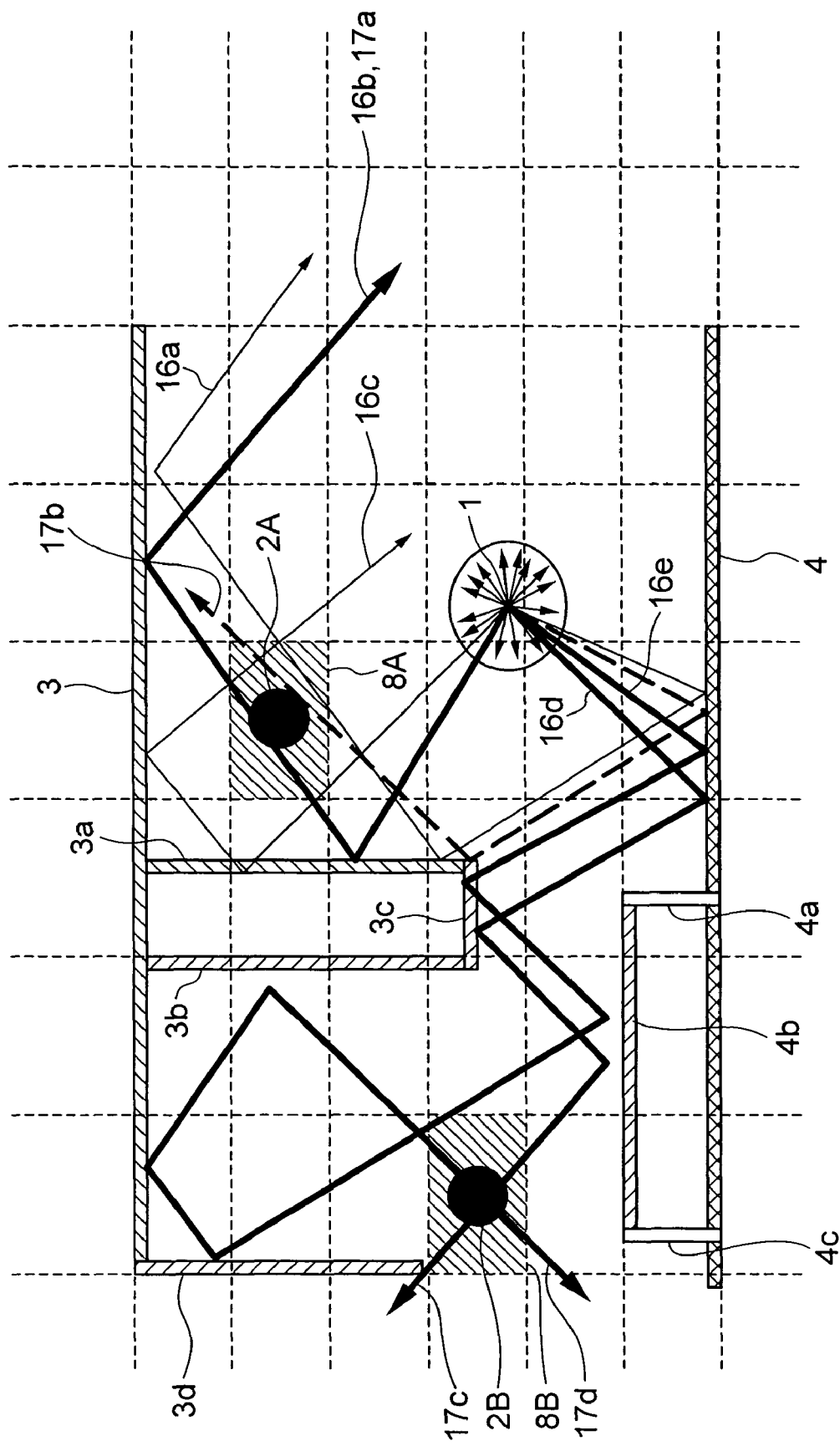
FIG. 9 is a diagram showing the effect of the first embodiment.
Figure 14:
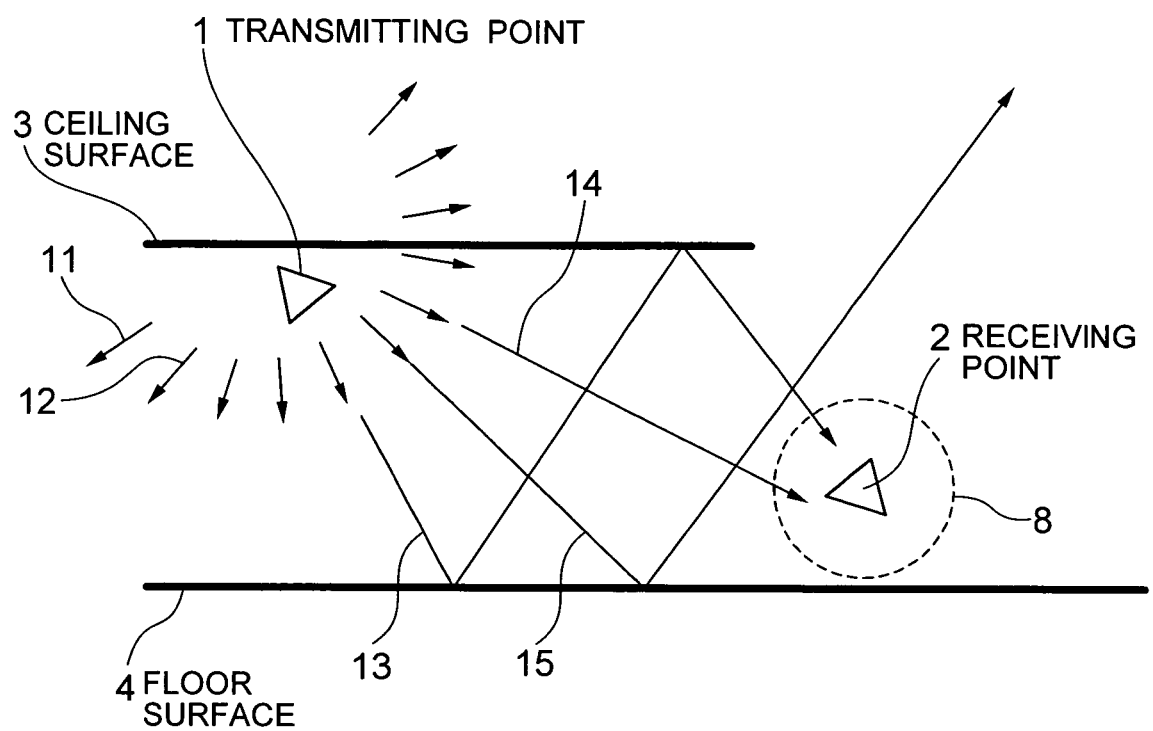
FIG. 14 is a diagram showing the estimation principle of a propagation path by the ray launching method.

In step 8, the receiving area setting unit 109 sets a receiving area including a receiving point accepted by the acceptance unit 101. This receiving area is a space such as a sphere 8 with a fixed radius whose center is the receiving point or a cube whose center is the receiving point as shown in FIG. 14. The size of the receiving area, that is, the radius of the sphere 8 or the length of one side of the cube, is determined considering the capacity of the antenna at the receiving point. In case where multiple receiving points are scattered at an interval of scores of meters or longer, the receiving area is determined according to the method described above. A mobile phone is also considered a receiving point. For example, when multiple receiving points 2a, 2b, . . . are set up at an interval of scores of meters considering the movement of a mobile phone as shown in FIG. 8, a space 9 including the multiple receiving points 2a, 2b, . . . is assumed. This space 9 is divided by the number of receiving points 2a, 2b, . . . , and the multiple receiving points 2a, 2b, . . . are positioned each in the center of divided spaces 8a, 8b, . . . . The divided spaces 8a, 8b, . . . may also be set up as the receiving areas of the multiple receiving points 8a, 8b, . . . . Because a receiving antenna has some receiving dimensions, the receiving point mentioned in this application is not an actual point but the receiving dimensions of the receiving antenna and the position of this receiving point is the center of the receiving dimensions of the receiving antenna.

Figure 5:
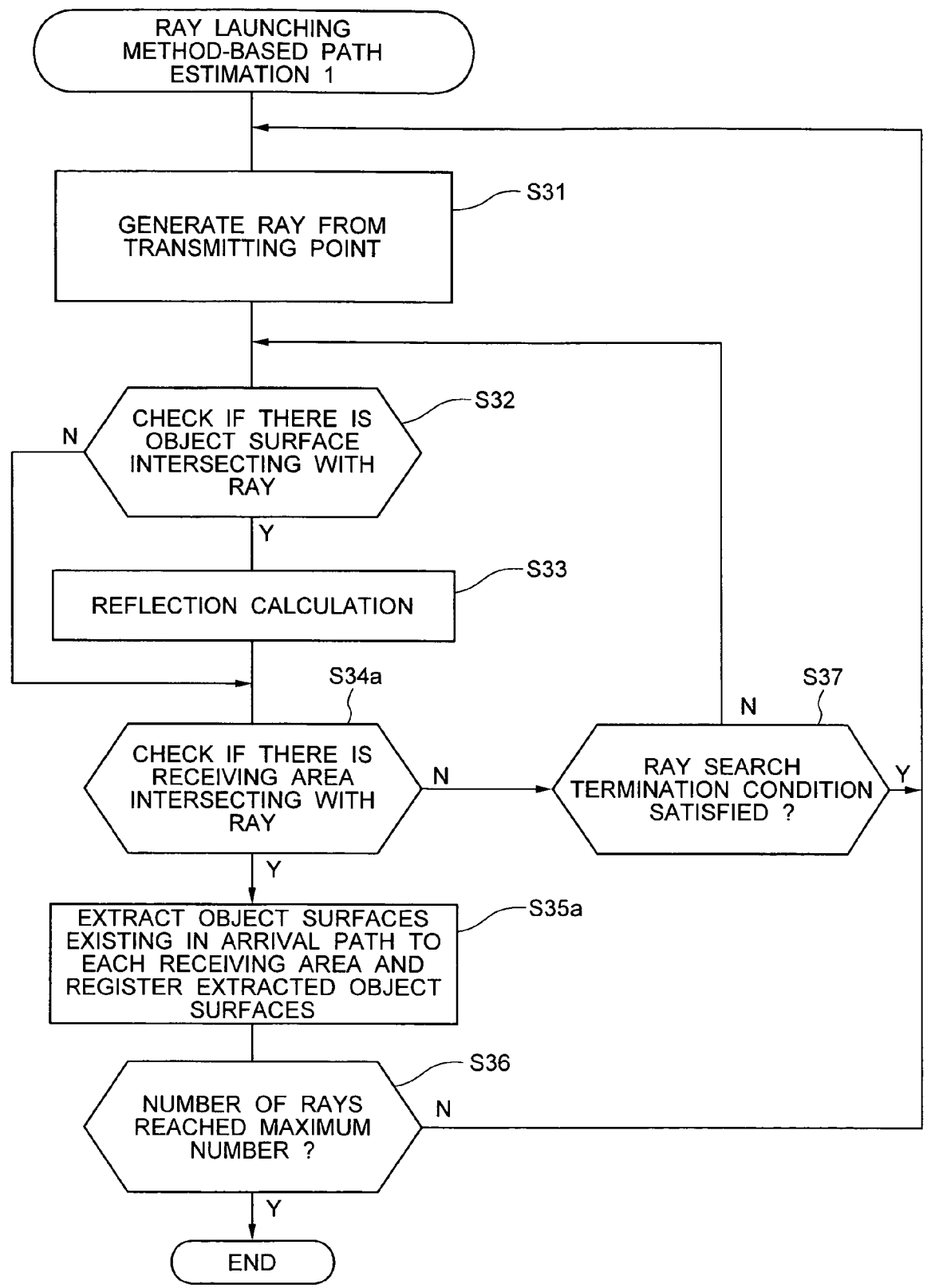
FIG. 5 is a flowchart showing the procedure of the ray launching method-based path estimation 1 in step 9 in FIG. 2.
Figure 6:
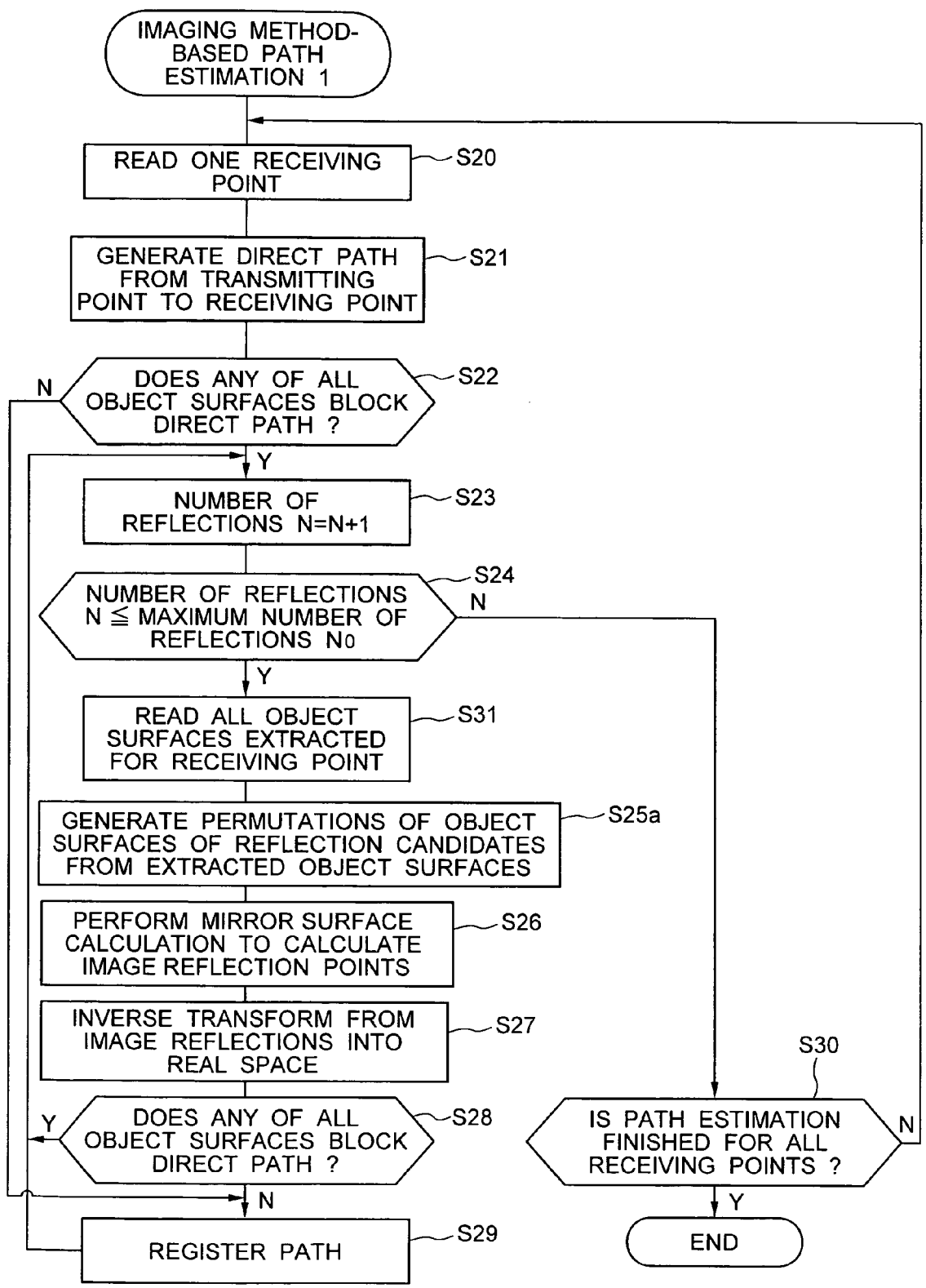
FIG. 6 is a flowchart showing the procedure of the imaging method-based path estimation 1 in step 10 in FIG. 2.

After the receiving area setting unit 109 sets the receiving area (S8), the ray launching method-based path estimation unit 102 executes "ray launching method-based path estimation 1", which is shown in FIG. 5 and will be described later, to extract the object surfaces existing in the path determined by this path estimation (S9). Next, the imaging method-based path estimation unit 103 uses the object surfaces extracted in step 9 to execute "imaging method-based path estimation 1" (S10), which is shown in FIG. 6 and will be described later, and terminates the processing.

Next, the following describes in detail "ray launching method-based path estimation 1" in step 9 described above with reference to the flowchart shown in FIG. 5.

The ray launching method-based path estimation unit 102 generates a ray (S31), checks if the ray intersects with an object surface (S32), and performs the reflection calculation for an intersecting object surface (S33) in the same manner as in "ray launching method-based path estimation 2" described with reference to FIG. 4. After the reflection calculation is terminated, the ray launching method-based path estimation unit 102 checks if there is a receiving area that includes a receiving point specified in step 8 in FIG. 2 and that intersects with the ray (S34a). Checking if the ray intersects with a receiving area including the receiving point in this way sometimes finds a path that does not actually arrive at the receiving point, but minimizes the possibility that a ray, which arrives at the receiving point, is not found. If it is determined in step S34a that there is no receiving area intersecting with the ray, control is passed to step 37 described above; if it is determined that there is one or more receiving area intersecting with the ray, control is passed to step 35a. In step 35a, the unit extracts the object surfaces existing in a ray arrival path to each of the receiving areas intersecting with the ray and registers the numbers of the object surfaces into the storage area 107. After that, the unit checks if the number of rays has reached the maximum number of rays (S36). If the number of rays has not yet reached the maximum number, control is passed back to step 31; if the number of rays has reached the maximum number, the processing is terminated. When an object surface is registered in step 35a, there are sometimes multiple ray paths to one receiving area and the same object surface is extracted for each of the paths. In this case, the unit does not register the object surface multiply but registers one object surface integrally.

As described above, the main purpose of "ray launching method-based path estimation 1" in step 9, which finds propagation paths, is to extract object surfaces, which exist in a propagation path, from all object surfaces.

Next, with reference to the flowchart in FIG. 6, the following describes in detail "imaging method-based path estimation 1" in step 10 described above.

As in "imaging method-based path estimation 2" described above with reference to FIG. 3, the imaging method-based path estimation unit 103 reads one receiving point (S20), generates a direct path from the transmitting point to the receiving point (S21), checks if there is a blocking object surface (S22), changes the number of reflections (S23), and checks if the allowable maximum number of reflections is reached (S24). After the checking of the allowable maximum number of reflections is terminated, the imaging method-based path estimation unit 103 reads all object surfaces, which are registered with association established with the receiving area including one receiving point that has been read in step 20, from the storage area 107 (S31), calculates the permutations of the object surfaces, that is, the permutations of the object surfaces of reflection candidates from all object surfaces extracted in step 9 described above, and lets the resulting permutations be reflection path candidates. The number of permutations, in other words, the number of reflection candidates, is $_mP_n$, as described in "Background of the Invention", where m is the number of all object surfaces and n is the number of object surfaces of reflection candidates. Note that the number m of all object surfaces to be processed is narrowed down from the all object surfaces existing in the target space and, as a result, the number n of object surfaces of reflection candidates is also reduced. Therefore, as compared when the number m of all object surfaces to be processed is the number of all object surfaces existing in the target space, the number of permutations, that is, the number of reflection path candidates, can be significantly reduced.

Next, as in "imaging method-based path estimation 2" described above with reference to FIG. 3, the unit performs mirror surface calculation to calculate image reflection points (S26), performs the inverse transform from image reflection points into the real space (S27), checks if there is a blocking object surface (S28), registers paths (S29), and passes control back to step 23. If the number of reflections exceeds the maximum number of reflections in step 24 while repeating the processing of step 23-step 29, the unit checks if path estimation is performed for all receiving points (S30). If path estimation is not yet performed for all receiving points, control is passed back to step 20; if path estimation is performed for all receiving points, the processing is terminated.

Because the number of object surfaces to be processed is reduced in the processing of step 9 shown in FIG. 2 in "imaging method-based path estimation 1" described above, the calculation time can be significantly reduced as compared when all object surfaces in the target space are processed. In addition, though the path of a ray that does not actually arrive at the receiving point is calculated in the processing in step 9, the imaging method can eliminate such a path and, as a result, increase the calculation accuracy.

The following describes the effect of a reduction in calculation time and an improvement in calculation accuracy, which have been described above, with reference to FIG. 9.

Assume that there are object surfaces 3, 3a, 3b, 3c, and 3d on the ceiling side, and object surfaces 4, 4a, 4b, and 4c on the floor side, as the object surfaces in the target space and that there are two receiving points 2A and 2B corresponding to the transmitting point 1.

First, the processing of step 8 in the general flowchart in FIG. 2 is executed to set a receiving area 8A, which includes a receiving point 2A, for the receiving point 2A, and a receiving area 8B, which includes a receiving point 2B, for the receiving point 2B.

Next, in "ray launching method-based path estimation 1" in step 9, multiple rays 16a, 16b, 16c, are generated from the transmitting point 1 and the paths of the rays 16a, 16b, 16c, . . . that arrive at the receiving areas 8A and 8B are found. For each of the receiving areas 8A and 8B, the object surfaces in the paths of the rays 16a, 16b, 16c, . . . that arrive at the receiving area are extracted. More specifically, object surfaces 3, 3a, and 4 existing in the paths of the rays 16a, 16b, and 16c that arrive at the receiving area 8A are extracted in this case for the receiving area 8A. Similarly, object surfaces 3, 3b, 3c, 3d, 4, and 4b existing in the paths of the 16d and 16e that arrive at the receiving area 8B are extracted for the receiving area 8B. In this "ray launching method-based path estimation 1", not only the path of the ray 16b that passes through the receiving point 2A but also the paths of the rays 16a and 16c, which pass near the receiving point 2A but do not pass through the receiving point 2A, are found, and the object surfaces 3, 3a, and 4 existing in those paths are extracted.

Next, in "ray tracing method-based path estimation 1" in step 10, the object surfaces 3, 3a, and 4 extracted in step 9 are used for the receiving point 2A as the object surfaces that change the propagation paths to find preparation paths 17a (=≈16b) and 17b, and the object surfaces 3, 3b, 3c, 3d, 4, and 4b extracted in step 9 are used for the receiving point 2B as the object surfaces that change the propagation paths to find the propagation paths 17c(≈16d) and 17d (=≈16e).

As a result, this method excludes the paths of the rays 16a and 16c, which are found in step 9 but do not pass through the receiving point 2A, but adds the path 17b which could not be found in step 9, thus accurately finding radio propagation paths 17a, 17b, 17c, and 17d that arrive at the receiving points 2A and 2B. In addition, to repeat the point, ray tracing based path estimation 1 in step 10 eliminates the need to perform the path calculation for the all object surfaces in the target space, thus making the path calculation time shorter than that required for all object surfaces.

In the embodiment described above, it is also possible to return to step 8 again if the number of object surfaces registered for one receiving area is less than a predetermined value when registering object surfaces in step 35a of the processing of step 9, to enlarge the receiving area by a predetermined amount in step 8, and then to execute step 9 again. In addition, though only the object surfaces existing in a ray path are registered in step 9 in this embodiment, it is also possible to register the permutations of the object surfaces along the path and, when generating the permutations of the object surfaces in step 25a of the processing of step 10, to use only the permutations registered in step 9. In this case, the calculation accuracy is reduced but the calculation time can be reduced. In addition, though the object surfaces are extracted and registered in step 35a of the processing of step 9 in this embodiment, it is also possible to register only the arrival paths in step 35a and, after step 9 and before step 10, to extract and register the object surfaces from the arrival paths.

In addition, though the ray launching method is used in step 7 to find radio paths arriving at the receiving point in this embodiment, it is also possible to perform the receiving area setting processing similar to that in step 8 before step 7 and, in step 7, to find the paths passing through the receiving area that is set by this receiving area setting processing.

If it is found in step 4 that the estimated calculation time exceeds the allowable calculation time, it is also possible to omit the processing of S6 and S7 and directly go to step 8, to omit the processing of steps 3, 4, and 5 after step 2 and directly perform step 6, and to omit the processing of steps 3, 4, 5, 6, and 7 after step 2 and directly perform the processing of step 8.

Second Embodiment

Next, a radio propagation estimating apparatus in a second embodiment of the present invention will be described with reference to FIG. 10-FIG. 12.

Figure 10:
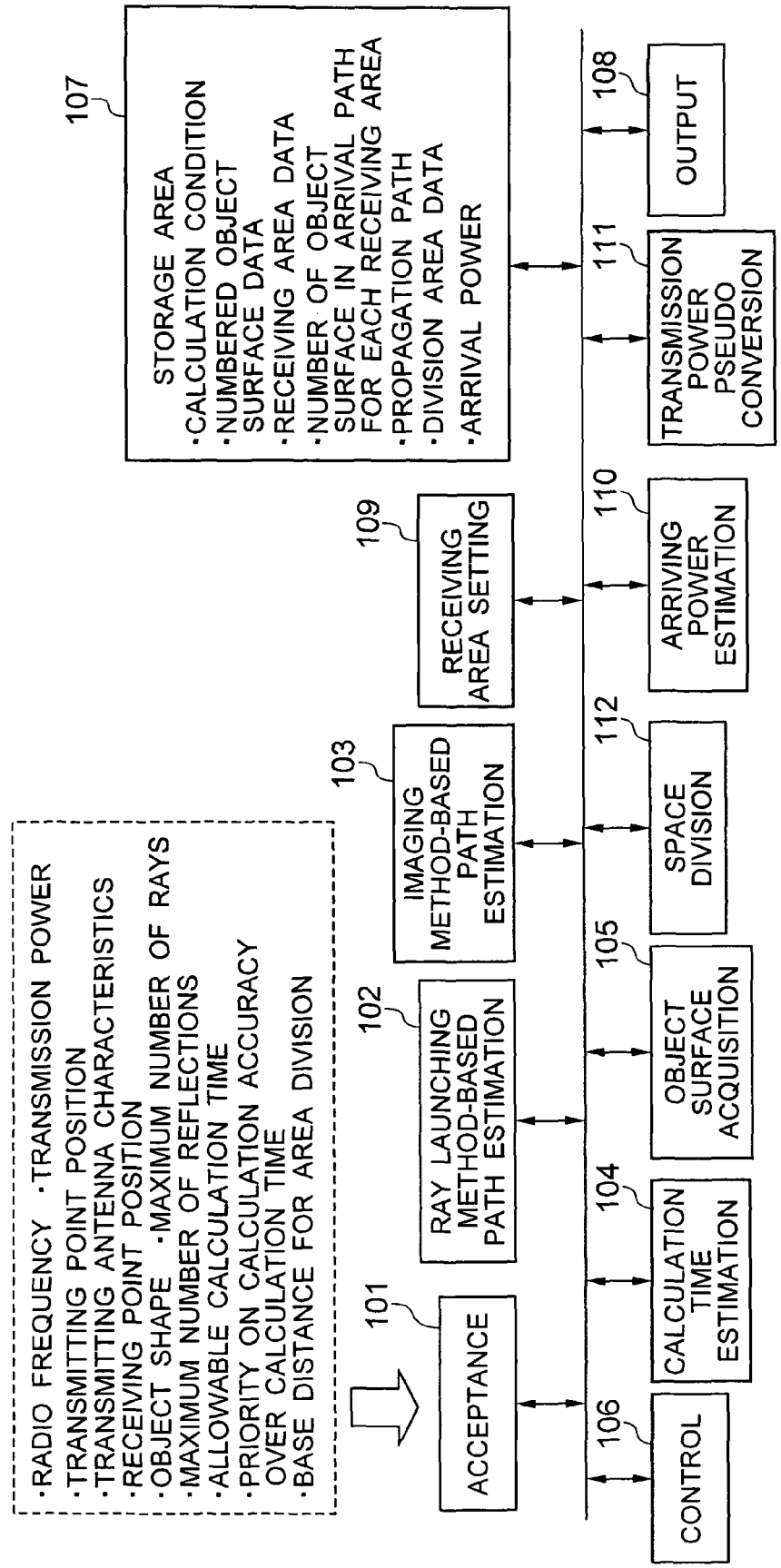
FIG. 10 is a functional block diagram showing a radio propagation estimating apparatus in a second embodiment.

As shown in FIG. 10, the radio propagation estimating apparatus in this embodiment has the configuration of the radio propagation estimating apparatus in the first embodiment and further comprises a space division unit 112 that divides a target space using a predetermined method, an arriving power estimation unit 110 that estimates the arriving power supplied to a predetermined position in the divided areas generated by the space division unit 112, and a transmission power pseudo conversion unit 111 that pseudo-converts the transmission power at a transmitting point. Like the control unit 106 described above in the first embodiment, those components 110, 111, and 112 each comprise a memory and a CPU that executes programs stored in this memory.

Figure 11:
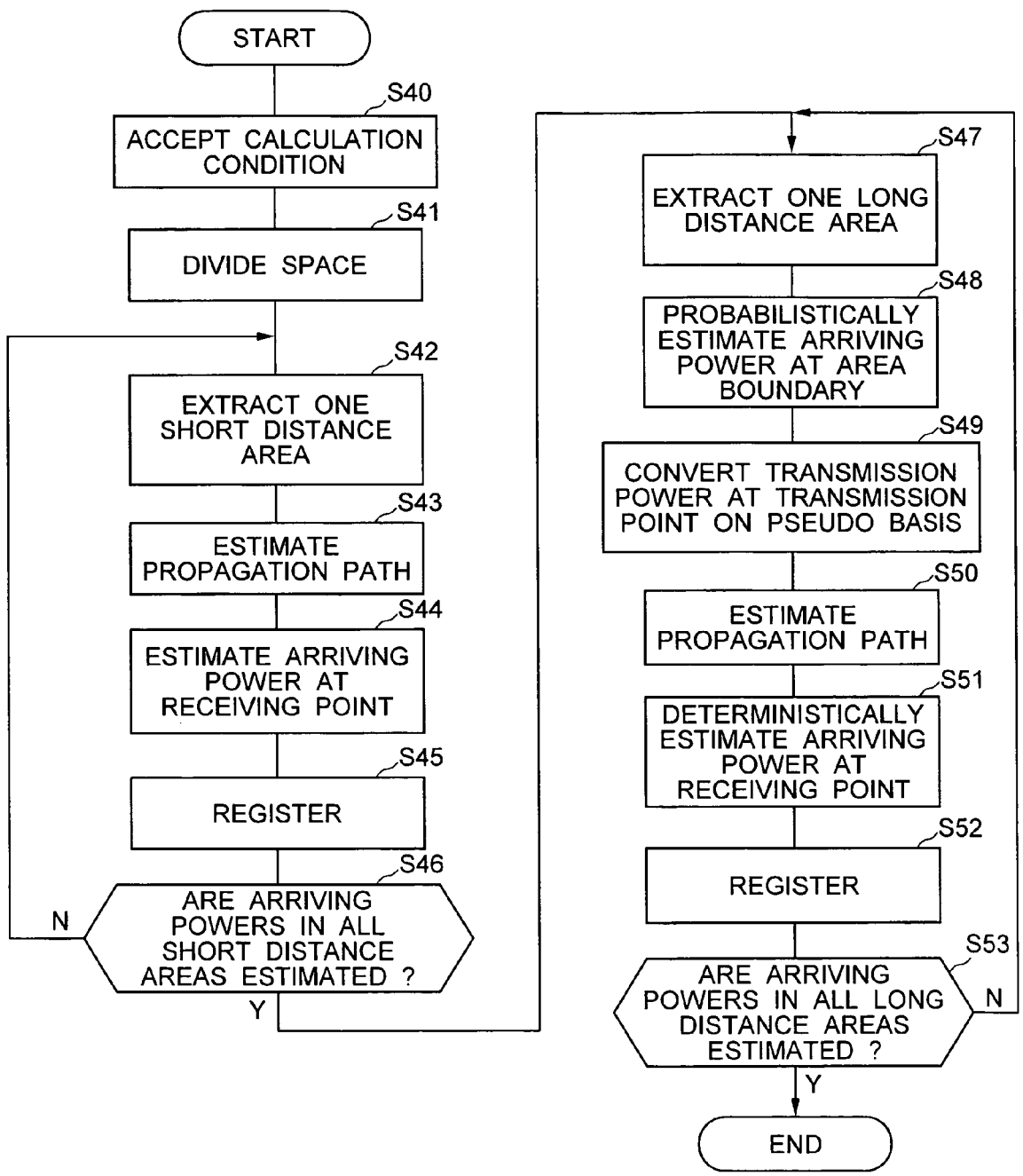
FIG. 11 is a flowchart showing the operation of the radio propagation estimating apparatus in the second embodiment.
Figure 12:
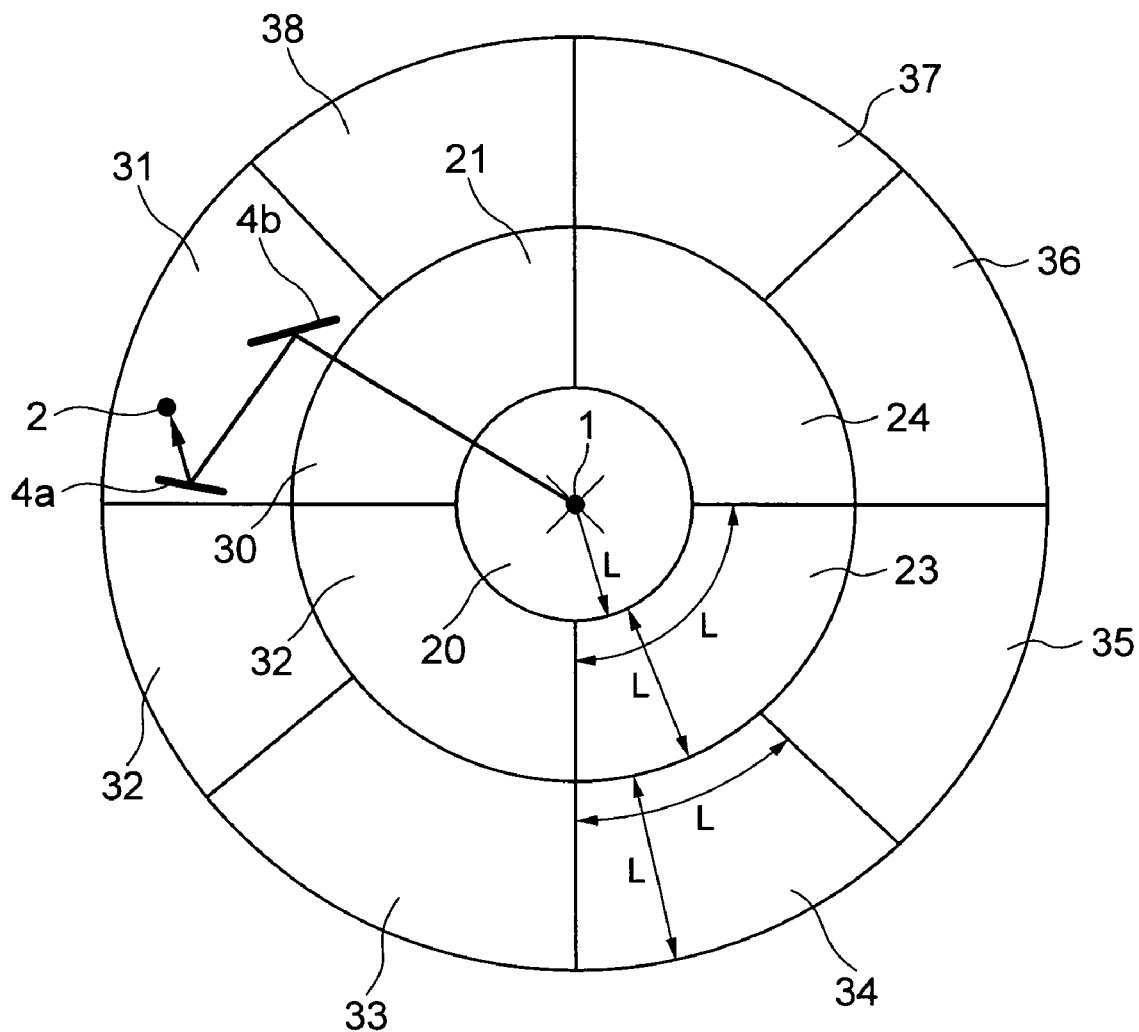
FIG. 12 is a diagram showing a method of dividing the area of a target space in the second embodiment.
Figure 13:
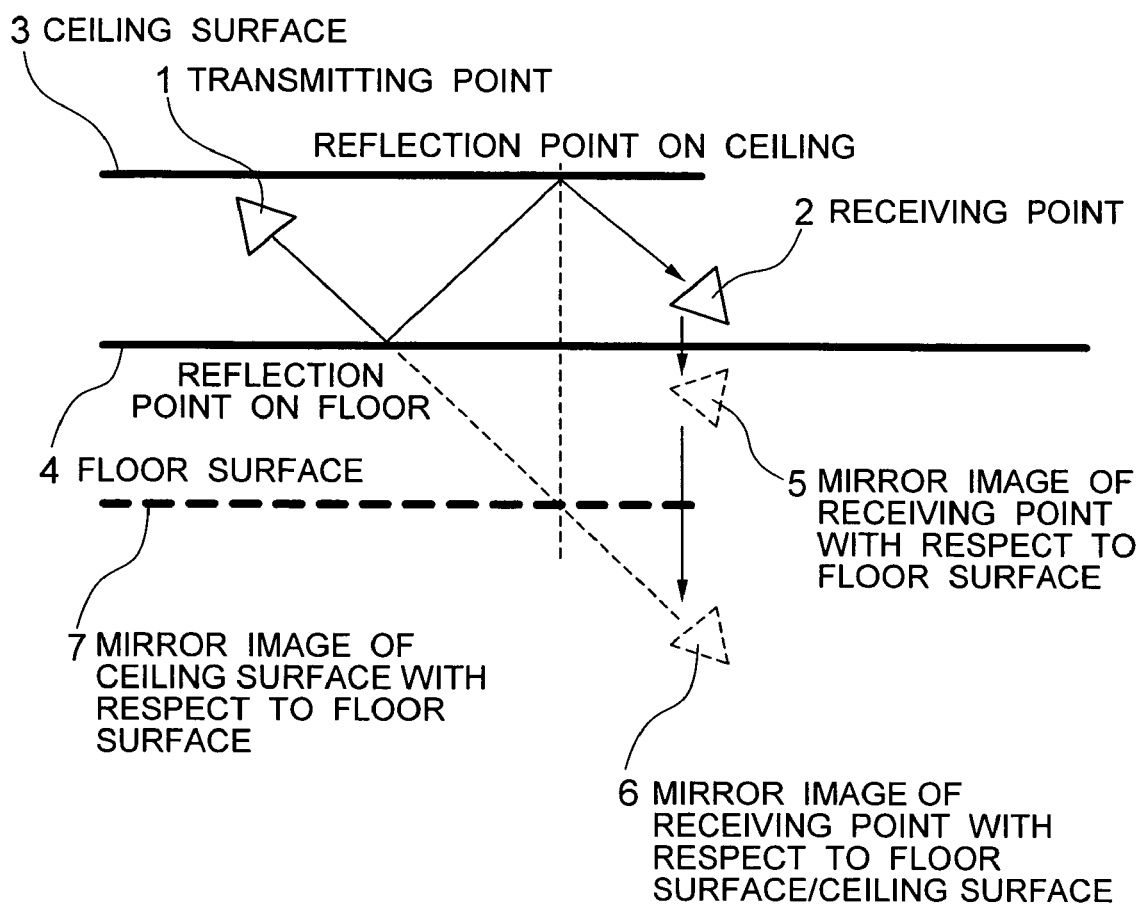
FIG. 13 is a diagram showing the estimation principle of a propagation path by the imaging method.

Next, the following describes the operation of the radio propagation estimating apparatus in this embodiment with reference to the flowchart shown in FIG. 11.

The user uses the input device of the apparatus to enter calculation conditions into the apparatus. An acceptance unit 101 accepts the calculation conditions and stores them in a storage area 107 (S40). The acceptance unit 101 accepts calculation conditions described in the first embodiment as well as the base distance L for dividing the space.

After the acceptance unit 101 of the radio propagation estimating apparatus accepts the calculation conditions (S40), the space division unit 112 divides the target space (S41). As shown in FIG. 12, the space division unit 112 uses the base distance L, accepted by the acceptance unit 101, to divide the target space into a short distance area 20 whose distance from the transmitting point 1 is smaller than L, an area whose distance from the transmitting point 1 is equal to or larger than L but is smaller than 2L, and an area whose distance from the transmitting point 1 is equal to or larger than 2L but is smaller than 3L. In addition, the space division unit 112 divides the area, whose distance from the transmitting point 1 is equal to or larger than L but is smaller than 2L, into first long distance areas 21, 22, 23, and 24 in such a way that the length of the boundary between each area and the short distance area 20 becomes L; similarly, the space division unit 112 divides the area, whose distance from the transmitting point 1 is equal to or larger than 2L but is smaller than 3L, into second long distance areas 31, 32, . . . , 38 in such a way that the length of the boundary between each area and the first distance area becomes L. In FIG. 12, the area whose distance from the transmitting point 1 is equal to or larger than L but is smaller than 2L is divided into four areas which are called first long distance areas 21, 22, 23, and 24 and the area whose distance from the transmitting point 1 is equal to or larger than 2L but is smaller than 3L is divided into eight areas which are called second long distance areas 31, 32, . . . , 38. This is only for convenience to make the figure easy to understand, and each area is divided in the circumferential direction based on L. Although the long distance areas are divided into the first long distance areas and the second long distance areas according to the distance from the transmitting point 1, only the first long distance areas are set when the target space is small or another long distance area may be set when the target space is large. The short-distance area 20, though not divided in the above example, may be divided into the circumferential direction according to the directivity characteristics of the antenna.

The following describes the base distance L used for dividing the target space. The distance L is a distance determined as follows. When the distance from the transmitting point 1 is L or larger, the propagation distance is very large with respect to the radio wavelength in the radio frequency that is used and, so, the probabilistic factors must be considered. Conversely, when the distance from the transmitting point 1 is smaller than L, the arriving power can be estimated without considering probabilistic factors. For example, L is a value that is one hundred or several hundred times of the frequency that is used. Therefore, the user must determine the base distance L appropriately considering the frequency that is used.

After the space division unit 112 divides the target space (S41), the control unit 106 extracts one short distance area 20 (S42). Next, the ray launching method-based path estimation unit 102, the imaging method-based path estimation unit 103 and so on execute the processing of step 2-step 10 in the first embodiment shown in FIG. 2 to find a radio propagation path from the transmitting point 1 to the receiving point in the short distance area 20 (S43). After finding the radio propagation distance, the arriving power estimation unit 110 uses the deterministic propagation loss estimation method, based on the propagation loss in the free space and Fresnel reflection/transmission coefficients, to estimate the power that propagates along the path and arrives at the receiving point (S44) and registers the correspondence between this value and the receiving point into the storage area 107 (S45). After the arriving power of one short distance area 20 is registered (S45), the control unit 106 checks if the arriving powers of all short distance areas are estimated (S46). If the arriving powers of all short distance areas are not yet estimated, control is passed to step 42. If the arriving powers of all short distance areas are estimated, control is passed to step 46. Because there is only one short distance area 20 in FIG. 12, control never returns to step 42.

After the estimation of arriving powers in all short distance areas is finished, the control unit 106 extracts one of multiple long distance areas (S47). In the description below, assume that the second long distance area 31 shown in FIG. 12 is extracted for convenience. Next, the arriving power estimation unit 110 estimates the arriving power to a boundary 30 on the transmitting point 1 side of the second long distance area 31 using the probabilistic power estimation method (S48).

An experimental expression such as the one shown in JP-A-2001-28570 described in "Background of the Invention" is applicable to this power estimation method. Alternatively, the power estimation method by the Okumura curve such as the one described in "Radio Propagation Handbook", Realize Co., the Nakagami-Rice fading expression, or the calculation of knife-edge diffraction for diffracting mountains is applicable. An experimental expression obtained from the actual measurements may also be used.

More specifically, an expression, for example, the following expression 1 described in "Radio Propagation Handbook" is used to estimate the arriving power to the boundary 30.

$$Lp = 69.55 + 22.16 \log f - 13.32 \log h_b - a(h_m) + (44.9 - 6.55 \log h_b) \log d \quad \text{(Expression 1)}$$

Lp: Propagation loss [dB]
f: Frequency [Hz]
$h_b$: Transmitting antenna height [m]
$h_m$: Receiving antenna height [m]
d: Distance [Km]

The method described in JP-A-2001-28570 assumes multiple paths as propagation paths from the transmitting point to the power estimation point. In contrast, the method in this embodiment uses only a propagation path directly connecting the transmitting point and the estimation point (boundary) to estimate power between them, thereby preventing multi-path effects, which may be potentially included in the empirical expression, from being considered doubly.

After the arriving power on the boundary 30 of the second short distance area 31 is estimated (S48), the transmission power pseudo conversion unit 111 uses the deterministic power estimation method to estimate the transmission power at the transmitting point 1 necessary for the above-described arriving-power to be received on the boundary 30, and lets the estimated transmission power be a pseudo-based transmission power (S49). More specifically, the directivity characteristics D(θ)[dB] in the θ direction of the transmitting antenna is calculated by the expression 2 given below and, from this expression 2, the pseudo transmission power at the transmitting point 1 is calculated, where P0 [dBm] is the transmission power at the transmitting point 1, (L+L)[m] is the distance from the transmitting point 1 to the boundary 30, Pa [dBm] is the arriving power on the boundary 30, and θ is the direction of the boundary area viewed from the transmitting point 1. In this case, the calculation described above is performed assuming that there is no object surface between the transmitting point 1 and the boundary 30.

$$D(\theta) = P - P0 + 20\log_{10}\frac{4\pi(L+L)}{\lambda} \quad \text{(Expression 2)}$$

Next, the ray launching method-based path estimation unit 102, the imaging method-based path estimation unit 103 and so on perform the processing in step 2-step 10 in the first embodiment shown in FIG. 2 to estimate a radio propagation path from the transmitting point 1 to the receiving point 2 in the second long distance area 31 (S50). In this case, too, the radio propagation path is estimated assuming that there is no object surface between the transmitting point 1 and the boundary 30 and that there are object surfaces 4*a* and 4*b* only in the second long distance area 31, as described above. If there are multiple receiving points in the second long distance area 31, a radio propagation path is estimated for each receiving point.

After the radio propagation path to each receiving point 2 in the second long distance area 31 is estimated (S50), the arriving power estimation unit 110 uses the deterministic power estimation method (S51) to estimate the arriving power at each receiving point 2 in the second long distance area 31 via the radio propagation path assuming that the radio wave is transmitted from the transmitting point 1 by the pseudo transmission power obtained in step 48, and registers the calculation result into the storage area 107 (S12).

After the arriving power in one long distance area is registered (S52), the control unit 106 checks if the arriving power is estimated in each receiving point in all long distance areas. If the arriving power is not yet estimated, control is passed back to step 47; if the arriving power is estimated, the processing is terminated (S53).

As described above, to estimate the arriving power at a receiving point in a long-distance area, the probabilistic power estimation method is used in this embodiment to a point relatively near the receiving point (boundary in this embodiment) and, from that point to the receiving point, the deterministic power estimation method is used. Thus, the arriving power at the receiving point is estimated accurately without considering the multi-path effect doubly.

Although the method described in the first embodiment is used to estimate a propagation path in the propagation path estimation processing in both step 43 and step 50 in the above embodiment, the invention in embodiments is not limited to this method but a propagation path may also be estimated by the simple ray launching method or the simple imaging method.

While the embodiments have been described above, it is to be understood that the present invention is not limited to the embodiments. It will be obvious to those skilled in the art that various changes and modifications may be made without departing from the spirit of the invention and the scope of the claims.

The invention claimed is:

1. A radio propagation estimating method of estimating a radio propagation path from a transmitting point of a radio wave to a receiving point of the radio wave, comprising:
   an acceptance step that accepts a position of the transmitting point and a position of the receiving point;
   an object surface acquisition step that acquires data on object surfaces that may affect the radio wave from the transmitting point;
   a receiving area setting step that sets a predetermined-size receiving area that includes the receiving point;
   a ray launching method-based path estimation step that estimates radio propagation paths of a plurality of rays via a ray launching method by using the acquired object surfaces, wherein the radio propagation paths are estimated for reaching the receiving point by reflecting the rays via one or more of the acquired object surfaces and the radio propagation paths of the plurality of rays are generated at the transmitting point;
   an object surface extraction step that extracts an only object surface from the acquired object surfaces, wherein the only object surface reflects the rays in the radio propagation paths of the rays reaching the receiving area estimated via the ray-launching method; and
   an imaging method-based path estimation step that estimates the radio propagation paths from the transmitting point to the receiving point via an imaging method using only non-overlapping object surfaces of the extracted object surfaces as being object surfaces on which the radio wave is reflected to change a direction of the radio propagation path.

2. The radio propagation estimating method according to claim 1 wherein
   a shape and a position of an object, which may affect the radio wave from the transmitting point, are accepted in said acceptance step, and
   the object surface data determining a surface of the object is acquired from the accepted shape and the position of the object in said object surface acquisition step.

3. The radio propagation estimating method according to claim 1 wherein an allowable calculation time is accepted in said acceptance step, said radio propagation estimating method further comprising:
   a calculation time estimation step that estimates a calculation time of radio propagation paths via the imaging method from a number of the object surfaces whose data is acquired in said object surface acquisition step;
   a calculation time checking step that checks if the calculation time estimated by said calculation time estimation step is equal to or shorter than the allowable calculation time; and
   a second imaging method-based path estimation step that estimates, via the imaging method, the radio propagation path from the transmitting point to the receiving point if the calculation time is determined, in said calculation time checking step, to be equal to or shorter than the allowable calculation time, using the object surfaces, whose data is acquired in said object surface acquisition step, as object surfaces on which the radio wave is reflected and which change the direction of the path.

4. The radio propagation estimating method according to claim 3 wherein
whether priority is put on a calculation time or calculation accuracy is accepted in said acceptance step,
said radio propagation estimating method further comprising:
a second ray launching method-based path estimation step that estimates, via the ray launching method, the radio propagation path from the transmitting point to the receiving point or to the receiving area considering the object surfaces whose data is acquired in said object surface acquisition step if the calculation time is determined to exceed the allowable calculation time in said calculation time checking step and if a request to put priority on the calculation time is accepted in said acceptance step.

5. The radio propagation estimating method according to claim 1, wherein the object surface extraction step comprises extracting the object surfaces from which reflection occurs in the path of the rays reaching the receiving area, and registering the object surfaces along the path.

6. The radio propagation estimating method according to claim 5, wherein the imaging method-based path estimation step calculates reflection occurring from a registered object surface based on the order of registration.

7. A radio propagation estimating apparatus that estimates a radio propagation path from a transmitting point of a radio wave to a receiving point, said apparatus comprising:
acceptance means for accepting a position of the transmitting point and a position of the receiving point;
object surface acquisition means for acquiring data on object surfaces that may affect the radio wave from the transmitting point;
receiving area setting means for setting a predetermined-size receiving area that includes the receiving point;
ray launching method-based path estimation means for estimating radio propagation paths of a plurality of rays via a ray launching method by considering the acquired object surfaces, wherein the radio propagation paths are estimated for reaching the receiving point by reflecting the rays via one or more of the acquired object surfaces and the radio propagation paths of the plurality of rays are generated at the transmitting point;
object surface extraction means for extracting an only object surface from the acquired object surfaces, wherein the only object surface reflects the rays in the radio propagation paths of the rays estimated or reaching the receiving area estimated via the ray-launching method; and
imaging method-based path estimation means for estimating the radio propagation paths from the transmitting point to the receiving point using only non-overlapping object surfaces of the extracted object surfaces as being object surfaces on which the radio wave is reflected to change a direction of the radio propagation path, and for calculating the radio propagation path using only the extracted object surfaces.

* * * * *